US009259648B2

(12) United States Patent
Hoomani et al.

(10) Patent No.: US 9,259,648 B2
(45) Date of Patent: Feb. 16, 2016

(54) INITIATE EVENTS THROUGH HIDDEN INTERACTIONS

(71) Applicant: Disney Enterprises, Inc., Burbank, CA (US)

(72) Inventors: Cyrus Hoomani, North Hollywood, CA (US); John Crocker, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 201 days.

(21) Appl. No.: 13/769,246

(22) Filed: Feb. 15, 2013

(65) Prior Publication Data

US 2014/0237392 A1 Aug. 21, 2014

(51) Int. Cl.
*A63F 13/40* (2014.01)
*H04L 12/58* (2006.01)
*A63F 13/30* (2014.01)

(52) U.S. Cl.
CPC ............... *A63F 13/10* (2013.01); *A63F 13/12* (2013.01); *H04L 51/32* (2013.01); *A63F 2300/5533* (2013.01)

(58) Field of Classification Search
CPC ............... A63F 13/12; A63F 2300/56; A63F 2300/556; A63F 2300/5533; G06F 3/048; G06F 3/04815
USPC .................................................. 715/706, 757
See application file for complete search history.

(56) References Cited

U.S. PATENT DOCUMENTS

| 7,702,728 | B2* | 4/2010 | Zaner et al. ............... 709/205 |
| 7,819,749 | B1* | 10/2010 | Fish et al. ............... 463/42 |
| 8,234,579 | B2* | 7/2012 | Do et al. ............... 715/757 |
| 8,253,735 | B2* | 8/2012 | Shuster ............... 345/419 |
| 8,453,219 | B2* | 5/2013 | Shuster et al. ............... 726/4 |
| 8,473,440 | B2* | 6/2013 | Brown ............... 706/45 |
| 2004/0179038 | A1* | 9/2004 | Blattner et al. ............... 345/751 |
| 2009/0254858 | A1* | 10/2009 | McCaffrey et al. ............... 715/810 |
| 2009/0282472 | A1* | 11/2009 | Hamilton et al. ............... 726/15 |
| 2010/0018382 | A1* | 1/2010 | Feeney et al. ............... 84/615 |
| 2010/0153868 | A1* | 6/2010 | Allen et al. ............... 715/764 |
| 2010/0278739 | A1* | 11/2010 | Bornhop et al. ............... 424/9.1 |
| 2011/0060744 | A1* | 3/2011 | Brignull et al. ............... 707/748 |
| 2011/0113382 | A1* | 5/2011 | Cannon et al. ............... 715/848 |

(Continued)

OTHER PUBLICATIONS

World of Warcraft Wiki, "Easter Eggs," and "List of Emotes," available at http://www.wowwiki.com/Easter_eggs, http://www.wowwiki.com/List_of_emotes, last accessed Oct. 23, 2014.*

(Continued)

*Primary Examiner* — Doon Chow
*Assistant Examiner* — James T Tsai
(74) *Attorney, Agent, or Firm* — Patterson + Sheridan, LLP

(57) ABSTRACT

System, method, and computer program product to trigger events in a virtual environment, by monitoring a communication in the virtual environment between at least a first user represented by a first avatar and a second user represented by a second avatar, the communication having an explicit meaning to the first and second users, determining whether the communication is predefined as a trigger associated with a corresponding event based on the communication having a secondary meaning not discernible from the explicit meaning, and upon determining that the communication is predefined as the trigger, triggering the corresponding event in the virtual environment.

24 Claims, 6 Drawing Sheets

(56) References Cited

U.S. PATENT DOCUMENTS

2011/0265018 A1* 10/2011 Borst et al. .................... 715/757
2012/0302350 A1* 11/2012 Murphy et al. ................. 463/42

OTHER PUBLICATIONS

"Easter Eggs," available at http://www.wowwiki.com/Easter_eggs, archived version via archive.org, dated Feb. 6, 2012, (hereinafter "WoW Easter Eggs"), last accessed Apr. 24, 2015.*

* cited by examiner

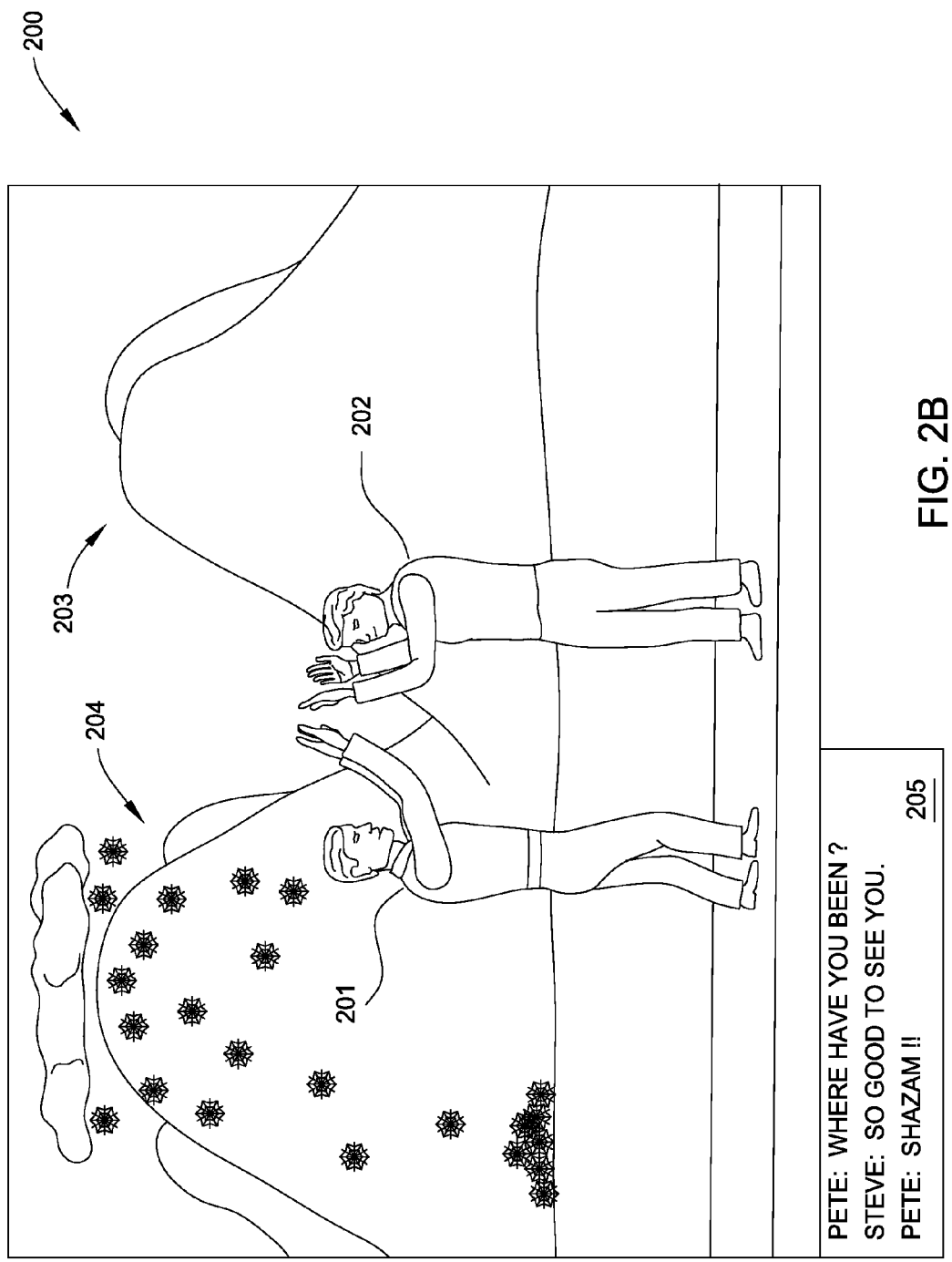

INITIATE EVENTS THROUGH HIDDEN INTERACTIONS

BACKGROUND

1. Field of the Invention

Embodiments disclosed herein relate to the field of computer software. More specifically, embodiments disclosed herein relate to computer software which initiates events through communications.

2. Description of the Related Art

A virtual world is a simulated environment in which users may inhabit and interact with one another via avatars. Users may also interact with virtual objects and locations of the virtual world. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, but may also include real-time voice communication.

Virtual worlds may be persistent. A persistent world provides an immersive environment (e.g., a fantasy setting used as a setting for a role-playing game) that is generally always available, and world events happen continually, regardless of the presence of a given avatar. Thus, unlike more conventional online games or multi-user environments, the plot and events continue to develop even while some of the players are not playing their characters.

Creating an engaging environment for online, virtual environments is a constant challenge. Developing new games and content within virtual environments is a big part of an engagement factor, and allowing users to be free in these environments tends to be a key factor.

SUMMARY

Embodiments disclosed herein provide a system, method, and computer program product to trigger events in a virtual environment, by monitoring a communication in the virtual environment between at least a first user represented by a first avatar and a second user represented by a second avatar, the communication having an explicit meaning to the first and second users, determining whether the communication is predefined as a trigger associated with a corresponding event based on the communication having a secondary meaning not discernible from the explicit meaning, and upon determining that the communication is predefined as the trigger, triggering the corresponding event in the virtual environment.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 2B illustrates a graphical user interface to initiate events through events triggered by hidden interactions, according to one embodiment disclosed herein.

DETAILED DESCRIPTION

Figure 1:
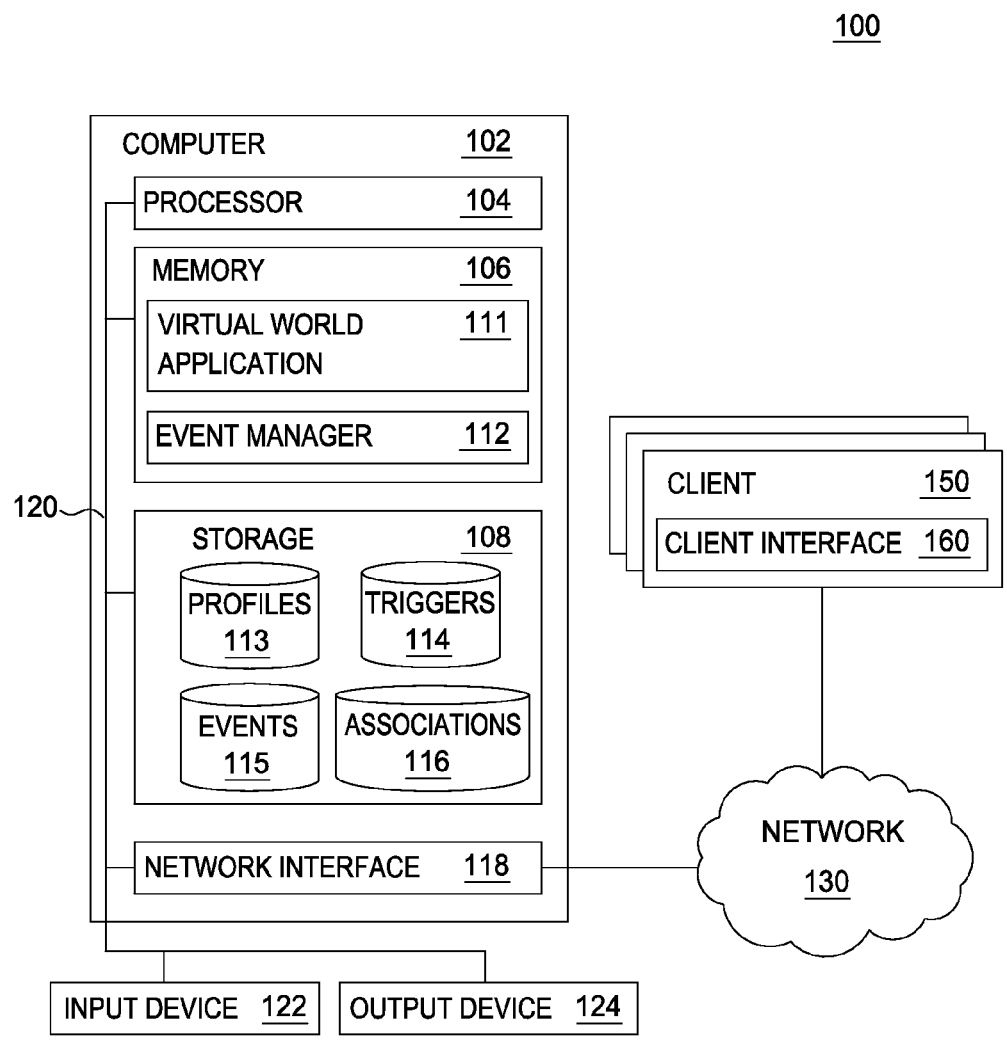
FIG. 1 is a block diagram illustrating a system to initiate events through hidden interactions, according to one embodiment disclosed herein.

Embodiments disclosed herein monitor communications (or interactions) between users of a virtual environment to initiate events through the communications. The events may be triggered when a specific trigger is detected. The triggering communications may be special text strings communicated between the users, or may include a series of gestures between avatars representing the users. The triggers may further be dynamic in nature, based on data related to the monitored communications as well as a set of user characteristics for each user participating in the communications.

Friends may have the tendency to create secret languages, greetings, handshakes, and other gestures in the real world. Human behavior tends to dictate specific hand gestures and local slang, to establish rank within a community or society. In addition to the explicit meaning of words, greetings, handshakes, and gestures, friends may apply a secondary (or hidden) meaning to the same words, greetings, handshakes, and gestures. These secondary meanings may not be discernible from the explicit meaning. The secondary meaning may indicate their friendship, affiliations, respect, and the like. Embodiments disclosed herein may monitor communications between avatars in a virtual environment to detect languages, greetings, and gestures having a secondary meaning, and trigger events in response.

For example, upon detecting a secret handshake between two avatars in the virtual environment, embodiments disclosed herein may present the users with a secret interactive game specifically for the two users. The details of the secret handshake, as well as user profile data of the two users, may indicate that a triggering condition is met, and the event should be triggered and presented to the users. As another example, if the users communicate text strings which may be determined to be "secret" codes, such as "abc123xyz," the condition may be met, and a multiplayer game may be unlocked where the two users may invite other users to join.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications that trigger events through hidden interactions or related data available in the cloud. For example, a virtual environment application could execute on a computing system in the cloud and trigger events through hidden interactions. In such a case, the virtual environment application could monitor user actions and store interaction data at a storage location in the cloud. Doing so allows a user to access this information from any computing system attached to a network connected to the cloud (e.g., the Internet).

FIG. 1 is a block diagram illustrating a system 100 to initiate events through hidden interactions. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

As shown, the memory 106 contains the virtual world application 111, which is an application generally configured to provide an interactive online experience through which a plurality of users can communicate in a virtual environment. The virtual world application 111 may be a video game, a virtual reality program, or any other application where users may be represented by avatars and navigate a virtual environment. The memory also contains an event manager 112, which is an application generally configured to monitor communications between users, and upon detecting communications having a secondary meaning not discernible from their explicit meaning, trigger an event in the virtual world application 111. Although shown as separate applications, in one embodiment, the event manager 112 may be a component of the virtual world application 111.

As shown, the storage 108 contains a plurality of profiles 113 which stores user profiles including a plurality of user-defined and programmatically collected characteristics about the users of the virtual environment 111. The characteristics, or profile data, of the users may include, but is not limited to, biographical data, preferences, hobbies, affiliations, friendship and family ties, activities, and the like. The storage 108 also contains a plurality of triggers 114, which is configured to store a plurality of user-defined and programmatically detected gestures and text strings which should trigger events in the virtual environment 111. The events manager 112, however, may not be limited to triggers stored in the triggers 114, as the events manager 112 may determine that a previously undetected interaction or text communication indicates that two users are exchanging communications having a secondary meaning, and trigger an event. Upon making this determination, the events manager 112 may store the previously undetected interaction a new trigger in the triggers 114. Additionally, an event from the plurality of events 115 may be a trigger 114. The storage 108 also contains a plurality of events 115, which is configured to store events that are triggered when triggering conditions are met. For example, the trigger might be a rain dance performed by two friends at a predefined location in the desert; and the event may be to provide an oasis upon detecting that trigger. In another embodiment, an event may provide a virtual race when triggered by two runners meeting and communicating a predefined text string. Although depicted as a database, the profiles 113, triggers 114, and events 115 may take any form sufficient to store data, including text files, xml data files, and the like.

In one embodiment, a relationship between the triggers 114 and the events 115 may be stored in an associations 116 data structure in the storage 108. In one embodiment, each of the profiles 113, triggers 114, and events 115, and the associations thereof are stored in a respective table in the storage 108, such as a profile table, a trigger table, an event table, and an association table. An example of the association table reflecting predefined associations between triggers and events is shown in the following table:

Table I

| Trigger/Event Association Table | | | | | |
|---|---|---|---|---|---|
| Assn. ID | Trigger ID | Trigger Name | Location | Event ID | Event Name |
| 0001 | 1940 | Text: "abc123" | Playground | 3628 | Free Throws |
| 0002 | 2039 | Secret Handshake | Work | 9843 | Ski Competition |
| 0003 | 8472 | Text: "cheesypies" | School | 5842 | Snowfall |
| 0004 | 3849 | Rain Dance | Forest | 8888 | Rain |
| 0005 | 8424 | Text: "abc123" | Home | 8471 | Ninja invasion |

For example, as shown in Table I, the association having an Association ID of "0002" establishes that a secret handshake between the communicating avatars while the avatars are located at work launches a ski competition in the virtual environment. Therefore, when the event manager 112 detects a secret handshake meeting the criteria of the trigger having a Trigger ID of 2039 at the specified location, the event manager 112 may identify the associated event in Table I, which may be stored in the associations 116. In some embodiments, the table may include other fields such as association name, association description, trigger description, event description, number of participating avatars, etc. As shown, the location of the avatars in the virtual environment, or of the users in the real world, has an impact on which event is triggered. As shown, entering the text "abc123" at a playground may trigger a free throw competition, but the same string entered at home may trigger a ninja invasion. The relationships between triggers and events may be predefined, dynamically defined, or user-defined. For the sake of illustration only, the association table is shown to include the trigger name and event name, but in some embodiments, the trigger name and the event name are stored in the trigger table and the event table, respectively, and not in the association table.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

Figure 2A:
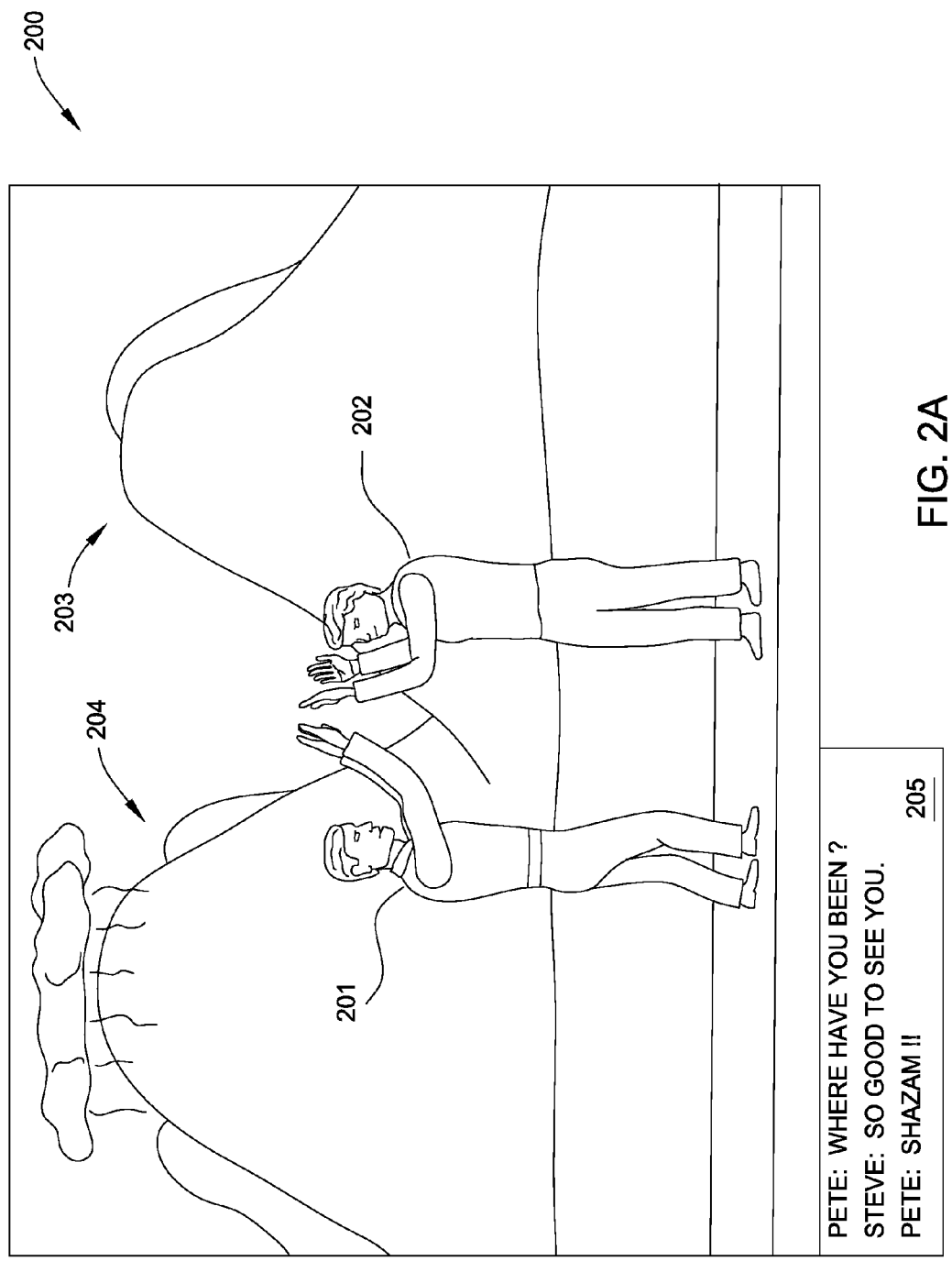
FIG. 2A illustrates a graphical user interface to initiate events through hidden interactions, according to one embodiment disclosed herein.

FIG. 2A illustrates a graphical user interface (GUI) 200 to initiate events through hidden interactions, according to one embodiment disclosed herein. Generally, the GUI 200 depicts communications having secondary meanings, which, when detected, initiate events in a virtual environment. As shown, the GUI 200 includes two avatars 201 and 202, which represent users controlling the avatars in the virtual environment, which may be provided by the virtual world application 111. The avatars are in a mountainous region, as shown by the mountains 203. The communications of the avatars 201 and 202 may be monitored by the event manager 112 in order to detect words and gestures having a secondary meaning in addition to their explicit meaning, indicative of a special relationship between the users, such that the event may be triggered. The event manager 112 may also retrieve data from the profiles 113 (as well as collect and store new data) related to the users of the avatars 201 and 202. For example, the data in the profiles 113 may indicate an age, nationality, gender, and other demographic information about the users. Additionally, the profiles 113 may indicate preference of the users, such as hobbies, pet peeves, favorite teams, sports, and the like. The profiles 113 may store relationships between users in the virtual world. For example, after monitoring repeated, lengthy communications between the avatars 201 and 202, the event manager 112 may determine that their respective users are friends, family members, or even enemies. The communications may be text based chat communications between the users controlling the avatars, or communications between the avatars of the users.

As shown, the avatars 201 and 202 are slapping both hands together. In one embodiment, such a gesture may be enough to allow the event manager 112 to detect a secondary meaning to the hand-slaps such that the event 204 from the events 115 may be triggered. The event 204 is smoke coming off one of the mountains 203. The event 204 may be any event, such as generating a game for the avatars 201 and 202 to participate in by themselves, or a group game that they may invite other friends to join in. Similarly, if one user is at a physical location, such as an amusement park, and another is a retail store, the triggered event can be a random event. In another embodiment, the dual hand slap may not be enough to trigger the event. In such embodiments, the event manager 112 may compare information in the profiles of the users of the avatars 201 and 202 to determine whether they are friends, share similar interests, are from the same geographical areas, and the like. Using this information, the event manager 112 may determine that gesture, in combination with the user data, conveys a secondary meaning, sufficient to trigger the event 204. In response, the event manager 112 may trigger the event 204. In still another embodiment, one of the users may have defined the dual hand slap as a triggering event in the events 115 which causes the event 204 to be displayed. In such an embodiment, the event manager 112, upon detecting the dual hand slap, may trigger the event 204.

The users of the virtual world application 111 may also interact through a text-based chat 205. As shown in FIG. 2, the users of the avatars 201 and 202 have been engaging in a chat. At one point, one of the users enters the phrase "Shazam!!" In one embodiment, a user may have entered this phrase as a triggering phrase in the triggers 114. Once the event manager 112 detects this phrase being communicated from one user to another, it may provide the effect 204. In embodiments where the phrase has not been defined by a user to be a triggering event, the event manager 112 may again reference the user data from the profiles 113, and determine whether the phrase has a secondary meaning between the users. The event manager 112 may compare data from the profiles to determine whether the chatting users are sufficiently related such that triggering the event from the events 115 is appropriate. For example, the users may be the same age, attend the same schools, and have a plurality of similar interests. In such a scenario, the event manager 112 may determine that "Shazam!!" has a secondary meaning, and trigger the event 204.

In one embodiment, the events 115 may be directly associated with a trigger 113. For example, the trigger 113 may specify that when two users are near a virtual lake and make fishhook gestures with their fingers, a specific event from the events 115 is to be displayed, and the users are given fishing rods. The event may then challenge the users to a fishing competition to see who catches the most fish. In another embodiment, the events 115 may be selected based on a plurality of factors, and may not be explicitly associated with a particular trigger. For example, if two avatars are skiing on a mountain and the event manager 112 determines that both users controlling the avatars love rock and roll music, the event manager 112 may select an event which plays the music of one of their favorite bands while they continue to ski.

FIG. 2B illustrates a graphical user interface to initiate events through events triggered by hidden interactions, according to one embodiment disclosed herein. In one embodiment, a first triggered event may itself be a triggering event which triggers a second triggered event. As shown, FIG. 2B includes the avatars 201-2, whose hand-slaps and text triggered the effect 204. However, the effect 204, of smoke coming off the mountain, may further trigger another event, based on a plurality of profile data, location data, and the like. As shown, a new effect 206 has been triggered. The new effect 206 includes snowfall on the avatars 201-2, and may further include providing the avatars with ski equipment such that they may ski on the mountains 203. The effect 206 is merely exemplary, as any effect may be implemented.

Figure 3:
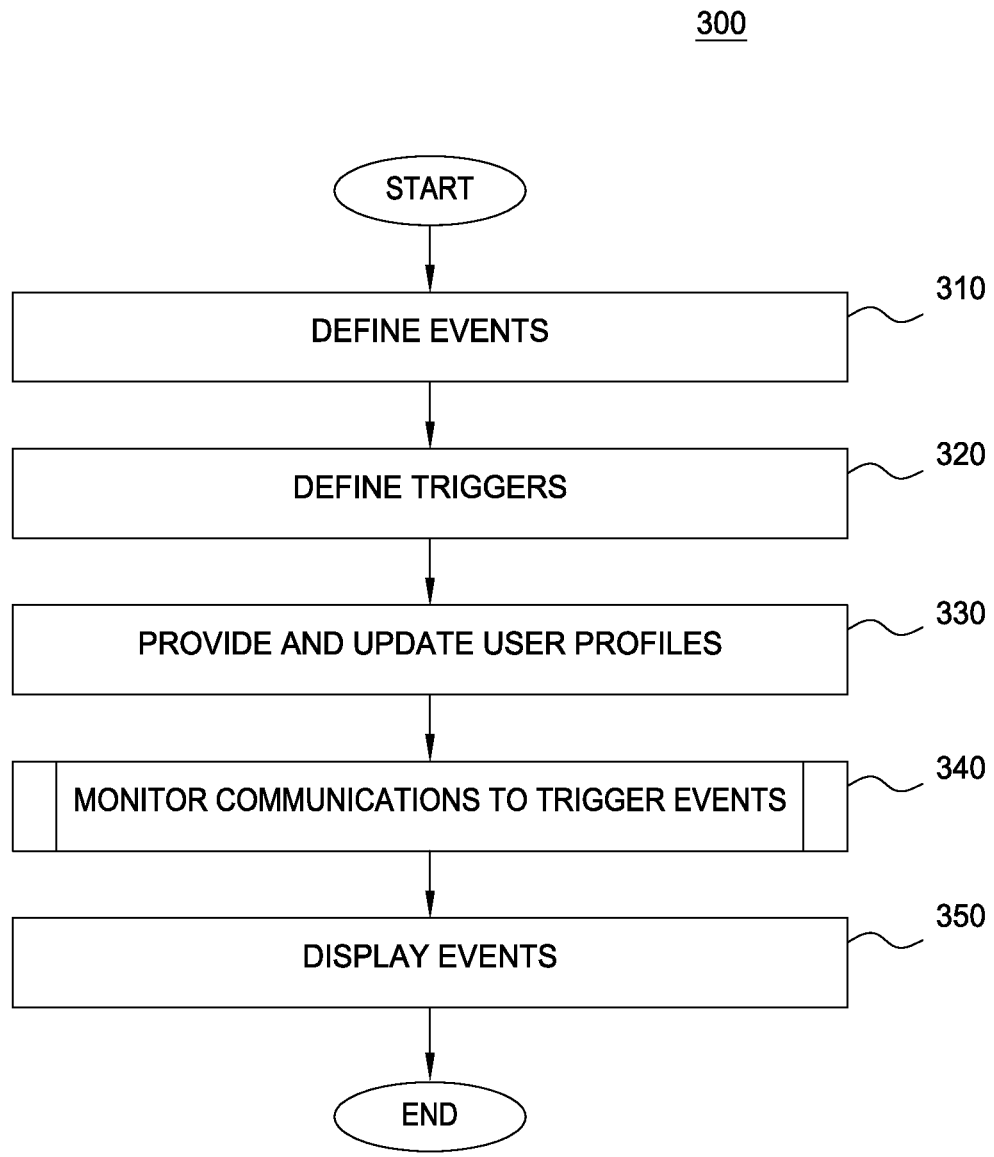
FIG. 3 is a flow chart illustrating a method to initiate events through hidden interactions, according to one embodiment disclosed herein.

FIG. 3 is a flow chart illustrating a method 300 to initiate events through hidden interactions, according to one embodiment disclosed herein. Generally, the steps of the method 300 provide special effects to users of a virtual world upon detecting triggering events between the users, or their avatars. The triggering events may be learned through machine learning, or may be user-defined. The triggering evens may further be text-based messages sent between the users, or gestures between avatars representing the users. The events presented to the users may be any effect displayed through the virtual environment. In one embodiment, the event manager 112 performs the steps of the method 300 in conjunction with the virtual world application 111.

At step 310, a plurality of events are defined in the virtual world application 111 and stored in the events 115. The events may be user-defined, or may be system default events. Furthermore, the virtual world application 111 may use machine learning to create new events. Generally, the events may include, but are not limited to, effects altering or enhancing existing objects in the virtual environment, adding new objects or effects to the virtual environment, and providing interactive games and challenges for the avatars. At step 320, a plurality of triggers for triggering the events may be defined.

In one embodiment, the triggers comprise determining whether the communications have a secondary meaning, in addition to their explicit meaning. The triggers may be defined by users, or may be default system-defined triggers. The triggers may be text strings, such as "abracadabra" or "aBc1two3." Additionally, the triggers may be gestures between users, such as intricate handshakes, hugs, or dances. The triggers may further be based on an analysis of profile data of each user in the profiles 113. For example, the event manager 112 may compare interests, workplaces, schools attended, friendship status, and the like to make an accurate determination as to whether the gestures or text communications have a secondary meaning, in addition to their explicit meaning, such that they may trigger an event in the virtual environment.

At step 330, the virtual world application 111 may provide user profiles, stored in the profiles 113. The virtual world application 111 (or the event manager 112) may continue to monitor user activity to update the profile data. In one embodiment, the user data stored in the profiles 113 may comprise user-supplied data. The profile data may include any definable attribute of the user, including, but not limited to biographical information, preferences, affiliations, hobbies, activities, and the like. At step 340, described in greater detail with reference to FIG. 4, the event manager 112 monitors the communications of users accessing the virtual world application 111. Generally, the step 340 may comprise monitoring the communications, accessing stored data related to the users, and making determinations as to whether the monitored communications have a secondary meaning indicating that the communications are more than what they appear to be on their surface. When such "hidden" communications are detected, the event manager 112 may trigger an event in the virtual environment. At step 350, the event manager 112 may display the events in the virtual environment. The steps of the method 300 may continuously be performed by the event manager 112 such that continuous monitoring is performed to provide events for the duration of the user's time in using the virtual world application 111.

Figure 4:
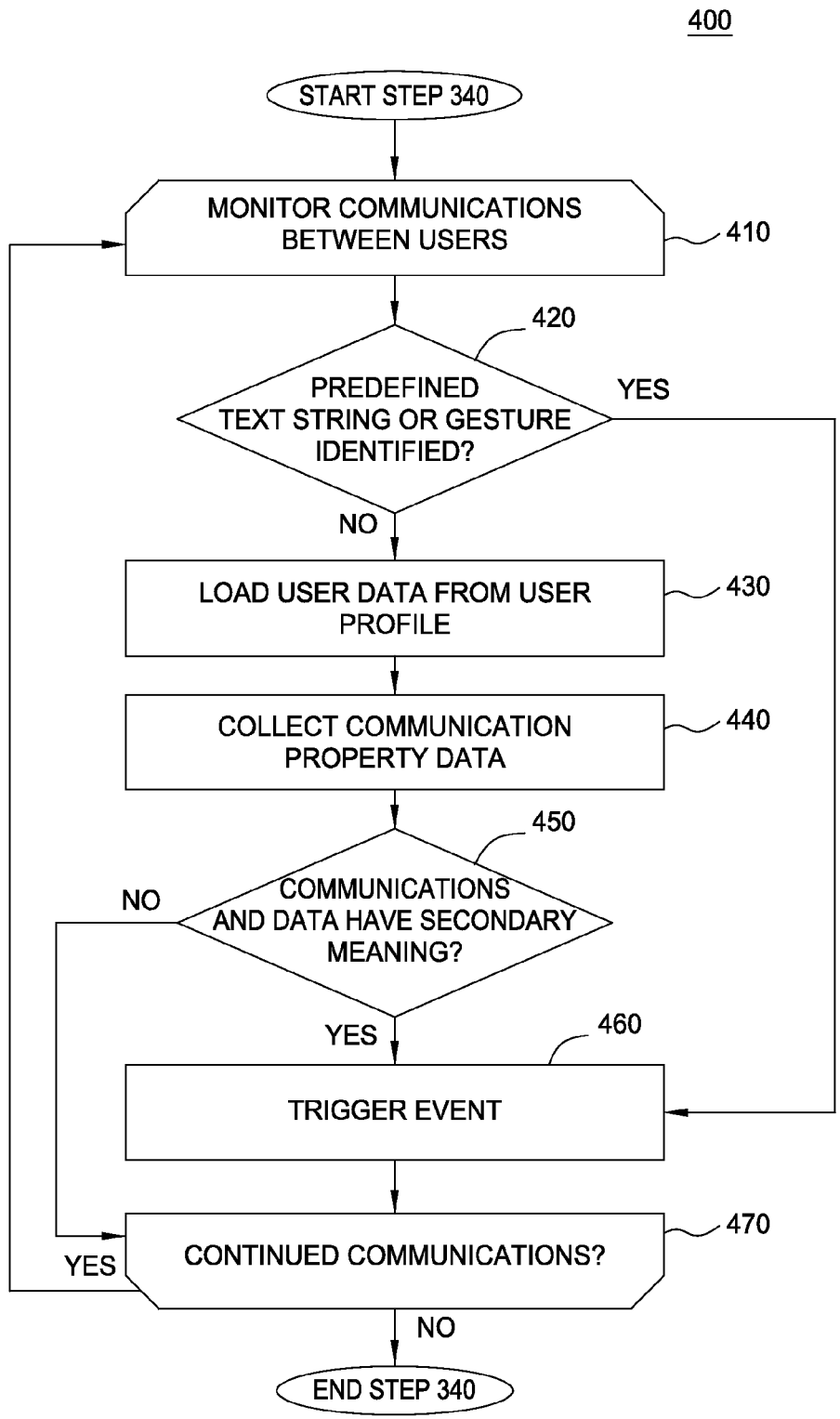
FIG. 4 is a flow chart illustrating a method to monitor interactions to trigger events, according to one embodiment disclosed herein.

FIG. 4 is a flow chart illustrating a method 400 to monitor communications to trigger events, according to one embodiment disclosed herein. In one embodiment, the steps of the method 400 may be performed by the event manager 112. Generally, the steps of the method 400 are executed to identify communications having secondary meanings between users of the virtual world application 111 that result in the triggering of special events in the virtual environment. At step 410, the event manager 112 begins executing a loop including steps 420-470 while at least two users (or their avatars) are interacting in the virtual environment provided by the virtual world application 111. At step 420, the event manager 112 determines whether a predefined text string or gesture has been identified by monitoring the communications. For example, one user may have defined a trigger 114 for a specific text string or an animated gesture such as an intricate handshake. Alternatively, the event manager 112 may have previously detected the communication and added it to the triggers 114. If the event manager 112 determines that the monitored communications are similar to a predefined trigger in the triggers 114, the event manager 112 proceeds to step 460. Otherwise, the event manager 112 proceeds to step 430. At step 430, the event manager 112, having monitored some level of communications between the users, loads user data from the profiles 113. The event manager 112 may load this data in order to have more information from which it may determine whether the communications being monitored have a secondary meaning, sufficient to trigger an event. In doing so, the event manager 112 may identify multiple common interests, personal attributes, and affiliations of the users, such that an otherwise common statement or gesture may have more meaning as between these particular users. Additionally, the event manager 112 may determine that the users have interacted on many different occasions in the past, or have an explicitly defined friendship. In such a case, the users may be engaging in communications having a secondary meaning, and it may be more appropriate to trigger an event. At step 440, the event manager 112 collects interaction property data regarding the communications. The interaction property data may include a number of participants, a location in the virtual environment, a date and time of the interaction, a duration of the interaction, and the like.

At step 450, the event manager 112 determines whether the communications and data indicate a relationship between the users, such that their communications should trigger an event in the virtual environment. In one embodiment, the event manager 112 may compute an interaction score for the monitored communications. If the interaction score exceeds a predefined threshold, the event manager 112 may determine that the relationship exists. If the event manager 112 determines that the relationship exists, the event manager 112 proceeds to step 460. Otherwise, the event manager 112 proceeds to step 470. At 460, the event manager 112 concludes that a triggering condition has been met and triggers an event in the virtual environment. The event may be a predefined event, an event associated with the type of interaction monitored, or may be generated based on the collected data. The event manager 112 may further reference the associations 116 to determine whether an association has been created for the detected communications, in light of the collected data regarding the users, their avatars, their location in the virtual environment, and the like. For example, if 10 friends are near a park pretending to shoot baskets, the event manager 112 may provide them with a virtual basketball game to participate in. Generally, any type of event may be provided within the virtual world application 111. At step 470, the event manager 112 determines whether communications are continuing between the users. If the communications continue, the event manager 112 returns to step 410. Otherwise, the users have stopped interacting, and the method 400 ends.

Figure 5:
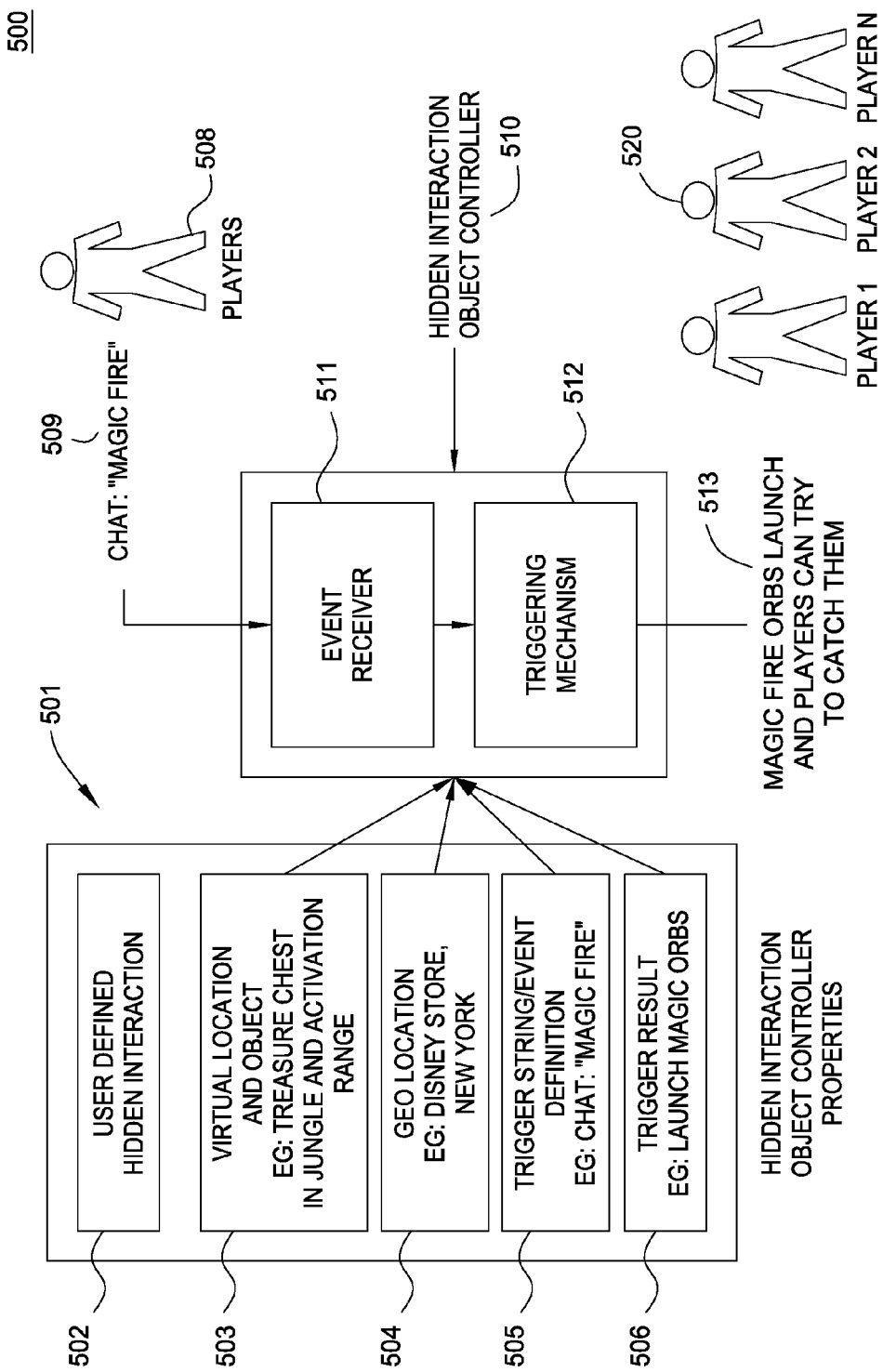
FIG. 5 is a block diagram illustrating components of a system to initiate events through hidden interactions, according to one embodiment disclosed herein.

FIG. 5 is a block diagram illustrating components of a system 500 to initiate events through hidden interactions, according to one embodiment disclosed herein. As shown, a hidden interaction object controller property data structure 501 includes a user-defined hidden interaction 502, which may contain a plurality of elements 503-506. The data structure may be stored in the storage or memory of a computing system, and a plurality of user-defined hidden interactions 502 may be defined. Element 503 indicates a triggerable object, and where it is located in the virtual space. The triggerable objects may be existing objects in the virtual space, or may be an avatar of another user in the virtual world. For example, the triggerable object 503 may be a treasure chest in the jungle. Element 504 may include an optional condition based on a player's position in the real world, or the avatar's location in the virtual world. For example, the real world position may be the Disney Store in New York, N.Y. The virtual position may be the virtual Disney Store in the virtual environment. The element 505 may be the hidden communication which triggers the event, such as user defined text strings, or available system events like emotes, item usage, and the like. An example of element 505, as shown, includes a string "Magic Fire." Element 506 indicates the triggered event, or what happens once the conditions are met. As shown, the example element 506 is launching magic orbs.

The system 500 also includes a hidden object interaction controller 510, which includes an event receiver 511 and a triggering mechanism 512. The event receiver 511 monitors user communications, including text and actions, to trigger events 512 based on the data in the properties 501. Therefore, the hidden object interaction controller 510 may monitor a player 508 type the text "Magic Fire" 509 to a fellow player 520. Once the text is identified, the event 513 is triggered, where magic orbs are fired and players try to catch them.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method to trigger events in a virtual environment, comprising:
    defining a plurality of associations between each of a plurality of triggers and a respective event, of a plurality of events, wherein the plurality of associations comprise: (i) predefined associations, (ii) associations dynamically generated responsive to detecting a new trigger, and (iii) user-defined associations;
    monitoring a gesture in the virtual environment between at least a first user represented by a first avatar and a second user represented by a second avatar, the gesture having an explicit meaning to the first and second users;
    determining that the gesture has a predefined meaning by:
        monitoring communications between the first and second users;
        computing an interaction score based on the monitored communications; and
        determining that the interaction score exceeds a relationship threshold;
        determining that the gesture is defined as a first trigger, of the plurality of triggers, based on the gesture having a predefined meaning;
    identifying a first association, of the plurality of associations, between the first trigger and a first event, of the plurality of events;
        triggering the first event in the virtual environment based on the first association;
    detecting the new trigger; and
    dynamically defining a new association, of the plurality of associations, between the new trigger and at least one of the plurality of events.

2. The method of claim 1, wherein the gesture comprises a gesture from one of the first avatar and the second avatar to the remaining one of the first avatar and the second avatar.

3. The method of claim 2, wherein the first event can only be invoked in the virtual environment by occurrence of the gesture, wherein the relationship threshold indicates a relationship between the first and second users.

4. The method of claim 3, wherein the first event is triggered by a virtual world application, wherein the virtual world application is configured to individually trigger each event selected from:
    (i) a second event of the plurality of events comprising a predefined activity in which the first user and the second user participate;
    (ii) a third event of the plurality of events comprising a predefined group activity in which the first user, the second user, and a third user participate, wherein the third user is invited responsive to user input from at least one of the first user and the second user;
    (iii) a fourth event of the plurality of events comprising a predefined graphical effect; and
    (iv) a fifth event of the plurality of events comprising a predefined audio effect.

5. The method of claim 4, wherein the first event is further triggered upon determining that the first avatar and the second avatar are in a predefined location in the virtual environment, wherein the predefined location is specific to the first event, wherein the predefined location is specified in the first association, wherein the second event is triggered upon determining the first avatar and the second avatar are in a second predefined location in the virtual environment, wherein the second predefined location is specified in a second association, of the plurality of associations, wherein the second event is different from the first event, wherein the second predefined location is different from the predefined location.

6. The method of claim 5, wherein the virtual world application is configured to determine that the gesture is defined as the first trigger based further on each of a plurality of gesture properties selected from:
    (i) a first gesture property comprising a length of time of the gesture;
    (ii) a second gesture property comprising a number of previous gestures between the first user and the second user;
    (iii) a third gesture property comprising a user-specified condition indicating when to trigger the event; and
    (iv) a fourth gesture property comprising a gesture type selected from a plurality of different gesture types.

7. The method of claim 6, wherein the virtual world application is configured to trigger events based individually on each of a plurality of event characteristics selected from:
    (i) a first event characteristic comprising a user-defined event associated with the gesture;
    (ii) a second event characteristic comprising a location of the first avatar and the second avatar in the virtual environment; and
    (iii) a third event characteristic comprising a number of avatars participating in the gesture.

8. The method of claim 7, wherein the virtual world application is configured to determine that the gesture is defined as the first trigger further based on each of a plurality of user characteristics stored in a user profile, the plurality of user characteristics comprising:
    (i) a first user characteristic comprising an age of the user;
    (ii) a second user characteristic comprising a gender of the user;

(iii) a third user characteristic comprising an affiliation of the user;
(iv) a fourth user characteristic comprising a hobby of the user;
(v) a fifth user characteristic comprising a skill level of the user;
(vi) a sixth user characteristic comprising an indication of time spent in the virtual environment;
(vii) a seventh user characteristic comprising a count of completed objectives in the virtual environment; and
(viii) an eighth user characteristic comprising a predefined friendship between the first user and the second user.

9. A computer program product to trigger events in a virtual environment, the computer program product comprising:
a non-transitory computer-readable storage medium having computer-readable program code embodied therewith, the computer-readable program code executable by a processor to perform an operation comprising:
defining a plurality of associations between each of a plurality of triggers and a respective event, of a plurality of events, wherein the plurality of associations comprise: (i) predefined associations, (ii) associations dynamically generated responsive to detecting a new trigger, and (iii) user-defined associations;
monitoring a gesture in the virtual environment between at least a first user represented by a first avatar and a second user represented by a second avatar, the gesture having an explicit meaning to the first and second users;
determining that the gesture has a predefined meaning by:
monitoring communications between the first and second users;
computing an interaction score based on the monitored communications; and
determining that the interaction score exceeds a relationship threshold;
determining that the gesture is defined as a first trigger, of the plurality of triggers, based on the gesture having a predefined meaning;
identifying a first association, of the plurality of associations, between the first trigger and a first event, of the plurality of events;
triggering the first event in the virtual environment based on the first association;
detecting the new trigger; and
dynamically defining a new association, of the plurality of associations, between the new trigger and at least one of the plurality of events.

10. The computer program product of claim 9, wherein the gesture comprises a gesture from one of the first avatar and the second avatar to the remaining one of the first avatar and the second avatar.

11. The computer program product of claim 10, wherein the first event can only be invoked in the virtual environment by occurrence of the gesture, wherein the
relationship threshold indicates a relationship between the first and second users.

12. The computer program product of claim 11, wherein the first event is triggered by a virtual world application, wherein the virtual world application is configured to individually trigger each event selected from:
(i) a second event of the plurality of events comprising a predefined activity in which the first user and the second user participate;
(ii) a third event of the plurality of events comprising a predefined group activity in which the first user, the second user, and a third user participate, wherein the third user is invited responsive to user input from at least one of the first user and the second user;
(iii) a fourth event of the plurality of events comprising a predefined graphical effect; and
(iv) a fifth event of the plurality of events comprising a predefined audio effect.

13. The computer program product of claim 12, wherein the first event is further triggered upon determining that the first avatar and the second avatar are in a predefined location in the virtual environment, wherein the predefined location is specific to the first event, wherein the predefined location is specified in the first association, wherein the second event is triggered upon determining the first avatar and the second avatar are in a second predefined location in the virtual environment, wherein the second predefined location is specified in a second association, of the plurality of associations, wherein the second event is different from the first event, wherein the second predefined location is different from the predefined location.

14. The computer program product of claim 13, wherein the virtual world application is configured to determine that the gesture is defined as the first trigger based further on each of a plurality of gesture properties selected from:
(i) a first gesture property comprising a length of time of the gesture;
(ii) a second gesture property comprising a number of previous gestures between the first user and the second user;
(iii) a third gesture property comprising a user-specified condition indicating when to trigger the event; and
(iv) a fourth gesture property comprising a gesture type selected from a plurality of different gesture types.

15. The computer program product of claim 14, wherein the virtual world application is configured to trigger events based individually on each of a plurality of event characteristics selected from:
(i) a first event characteristic comprising a user-defined event associated with the gesture;
(ii) a second event characteristic comprising a location of the first avatar and the second avatar in the virtual environment; and
(iii) a third event characteristic comprising a number of avatars participating in the gesture.

16. The computer program product of claim 15, wherein the virtual world application is configured to determine that the gesture is defined as the first trigger further based on each of a plurality of user characteristics stored in a user profile, the plurality of user characteristics comprising:
(i) a first user characteristic comprising an age of the user;
(ii) a second user characteristic comprising a gender of the user;
(iii) a third user characteristic comprising an affiliation of the user;
(iv) a fourth user characteristic comprising a hobby of the user;
(v) a fifth user characteristic comprising a skill level of the user;
(vi) a sixth user characteristic comprising an indication of time spent in the virtual environment;
(vii) a seventh user characteristic comprising a count of completed objectives in the virtual environment; and
(viii) an eighth user characteristic comprising a predefined friendship between the first user and the second user.

17. A system, comprising:
one or more computer processors; and
a memory containing a program, which when executed by the one or more computer processors, performs an operation to trigger events in a virtual environment, the operation comprising:
defining a plurality of associations between each of a plurality of triggers and a respective event, of a plurality of events, wherein the plurality of associations comprise: (i) predefined associations, (ii) associations dynamically generated responsive to detecting a new trigger, and (iii) user-defined associations;
monitoring a gesture in the virtual environment between at least a first user represented by a first avatar and a second user represented by a second avatar, the gesture having an explicit meaning to the first and second users;
determining that the gesture has a predefined meaning by:
monitoring communications between the first and second users;
computing an interaction score based on the monitored communications; and
determining that the interaction score exceeds a relationship threshold;
determining that the gesture is defined as a first trigger, of the plurality of triggers, based on the gesture having a predefined meaning;
identifying a first association, of the plurality of associations, between the first trigger and a first event, of the plurality of events;
triggering the first event in the virtual environment based on the first association; detecting the new trigger; and
dynamically defining a new association, of the plurality of associations, between the new trigger and at least one of the plurality of events.

18. The system of claim 17, wherein the gesture comprises a gesture from one of the first avatar and the second avatar to the remaining one of the first avatar and the second avatar.

19. The system of claim 18, wherein the first event can only be invoked in the virtual environment by occurrence of the gesture, wherein the relationship threshold indicates a relationship between the first and second users.

20. The system of claim 19, wherein the virtual world application is configured to determine that the gesture is defined as the first trigger based further on each of a plurality of gesture properties selected from:
(i) a first gesture property comprising a length of time of the gesture;
(ii) a second gesture property comprising a number of previous gestures between the first user and the second user;
(iii) a third gesture property comprising a user-specified condition indicating when to trigger the event; and
(iv) a fourth gesture property comprising a gesture type selected from a plurality of different gesture types.

21. The system of claim 20, wherein the first event is further triggered upon determining that the first avatar and the second avatar are in a predefined location in the virtual environment, wherein the predefined location is specific to the first event, wherein the predefined location is specified in the first association, wherein the second event is triggered upon determining the first avatar and the second avatar are in a second predefined location in the virtual environment, wherein the second predefined location is specified in a second association, of the plurality of associations, wherein the second event is different from the first event, wherein the second predefined location is different from the predefined location.

22. The system of claim 21, wherein the virtual world application is configured to determine that the gesture is defined as the first trigger based further on each of a plurality of gesture properties selected from:
(i) a first gesture property comprising a length of time of the gesture;
(ii) a second gesture property comprising a number of previous gestures between the first user and the second user;
(iii) a third gesture property comprising a user-specified condition indicating when to trigger the event; and
(iv) a fourth gesture property comprising a gesture type selected from a plurality of different gesture types.

23. The system of claim 22, wherein the virtual world application is configured to trigger events based individually on each of a plurality of event characteristics selected from:
(i) a first event characteristic comprising a user-defined event associated with the gesture;
(ii) a second event characteristic comprising a location of the first avatar and the second avatar in the virtual environment; and
(iii) a third event characteristic comprising a number of avatars participating in the gesture.

24. The system of claim 23, wherein the virtual world application is configured to determine that the gesture is defined as the first trigger further based on each of a plurality of user characteristics stored in a user profile, the plurality of user characteristics comprising:
(i) a first user characteristic comprising an age of the user;
(ii) a second user characteristic comprising a gender of the user;
(iii) a third user characteristic comprising an affiliation of the user;
(iv) a fourth user characteristic comprising a hobby of the user;
(v) a fifth user characteristic comprising a skill level of the user;
(vi) a sixth user characteristic comprising an indication of time spent in the virtual environment;
(vii) a seventh user characteristic comprising a count of completed objectives in the virtual environment; and
(viii) an eighth user characteristic comprising a predefined friendship between the first user and the second user.

* * * * *